United States Patent [19]

Dettmann

[11] Patent Number: 6,145,806
[45] Date of Patent: Nov. 14, 2000

[54] MINIATURIZED MAGNETIC VALVE

[75] Inventor: Heinrich Dettmann, Niedernhall, Germany

[73] Assignee: Burkert Werke GmbH & Co., Ingelfingen, Germany

[21] Appl. No.: 09/147,648

[22] PCT Filed: Jun. 9, 1998

[86] PCT No.: PCT/EP98/03442

§ 371 Date: Feb. 8, 1999

§ 102(e) Date: Feb. 8, 1999

[87] PCT Pub. No.: WO98/57081

PCT Pub. Date: Dec. 17, 1998

[30] Foreign Application Priority Data

Jun. 9, 1997 [DE] Germany ............................ 297 10 020

[51] Int. Cl.[7] .................................................. F16K 31/08
[52] U.S. Cl. ................. 251/65; 137/625.44; 251/129.05; 251/129.15
[58] Field of Search ................. 137/625.44, 870, 137/875; 251/65, 129.05, 129.15, 129.08

[56] References Cited

U.S. PATENT DOCUMENTS

| 3,215,162 | 11/1965 | Carver | 137/625.44 |
|---|---|---|---|
| 3,457,955 | 7/1969 | Kleiner et al. | 137/625.44 |
| 3,484,074 | 12/1969 | Lynes et al. | 251/65 |
| 4,343,329 | 8/1982 | Turansky et al. | 137/625.44 |
| 4,574,841 | 3/1986 | Hugler | 251/65 |
| 4,621,660 | 11/1986 | Klocke | 251/65 |
| 4,765,370 | 8/1988 | Ariizumi et al. | 137/625.44 |
| 5,318,071 | 6/1994 | Gaiardo | 137/625.44 |
| 5,711,346 | 1/1998 | Pieloth et al. | 137/625.44 |
| 5,799,696 | 9/1998 | Weiss | 137/625.44 |

FOREIGN PATENT DOCUMENTS

| 0376894 | 7/1990 | European Pat. Off. |
|---|---|---|
| 3513282 | 6/1986 | Germany . |
| 3528072 | 2/1987 | Germany . |
| 4139947 | 6/1993 | Germany . |
| 4314581 | 11/1994 | Germany . |

Primary Examiner—George L. Walton
Attorney, Agent, or Firm—Nixon Peabody LLP; Stuart J. Friedman

[57] ABSTRACT

A miniaturized solenoid valve is provided which is suitable for integration in an electric or electronic control circuit by it being built up on a printed circuit board. The valve has a narrow elongated housing (10) with a fluidic space (26) at one longitudinal end, and a solenoid drive (12, 14) at the opposite longitudinal end. Soldering pins protrude from the base surface of the housing, which are electrically connected to the solenoid (12) of the solenoid drive. The fluidic connections are easily accessible from the top side of the housing (10).

10 Claims, 2 Drawing Sheets

MINIATURIZED MAGNETIC VALVE

The invention relates to a miniaturized solenoid valve comprising a generally parallelepiped housing which contains a solenoid drive and a fluidic space separated therefrom.

According to the current state of art, fluidic and electric or electronic control circuits are built up separately. This means that solenoid valves of fluidic equipment are connected by means of bus lines or separate electric connecting lines to the electric or electronic circuits. Whilst it is possible to integrate electronic components in solenoid valves, no solenoid valves for integration into electric or electronic circuits are available.

The invention provides a miniaturized solenoid valve which is suitable for integration in electric or electronic circuits. This is achieved in that soldering pins, electrically connected to the solenoid drive, protrude from the base surface of the housing of the solenoid valve. The solenoid valve can therefore be placed directly on a printed circuit board and soldered in.

The fluidic connections of the solenoid valve according to the invention are preferably arranged on the top side of the housing opposite the base surface and are therefore easily accessible for being connected with flexible hoses.

In the preferred embodiment, the housing of the solenoid valve is of elongated construction. The width of the housing amounts, for example, to little more than 5 mm. The fluidic space is arranged at one longitudinal end of the housing, and the solenoid drive at the opposite longitudinal end. An actuation lamina extends from the solenoid drive to the fluidic space. This actuation lamina is preferably swivel-mounted in the housing, near the fluidic space by means of a jacket made of an elastic material. By virtue of this design, the actuating lamina forms a lever with a large transmission ratio. The solenoid valve can therefore operate with low switching forces and yet switch relatively high pressures up to approximately 8 bar.

For the integration into electric and electronic circuits it is particularly advantageous to embody the solenoid valve as a pulse-controlled unit, either bistable or monostable. To this purpose, the solenoid drive preferably is provided with a permanent magnet which can move between two soft iron parts, and a solenoid whose current-pulse induced magnetic field moves the permanent magnet against one or the other soft iron part, depending on the polarity of the magnetic field. Without biasing into one or the other switching position, such a solenoid valve is stable in each switching position. By the addition of a biasing spring, the solenoid valve becomes a pulse-controlled monostable valve.

In order to optimize the switching behavior of the solenoid valve according to the invention, in a further development of the invention a drive circuit is provided which for each actuation supplies a current pulse which terminates before the respective change-over position is reached. This ensures not only an optimum switching speed but also a largely bounce-free structure, with the result that the desired switching positions are safely reached and maintained.

Further details and characteristics of the invention result from the following description of a preferred embodiment, and from the illustration to which reference is made and in which.

Figure 2:
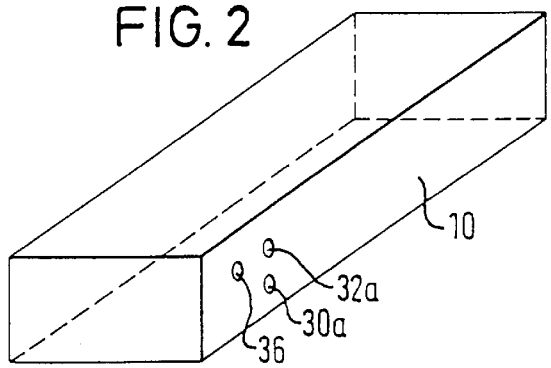
FIG. 2 shows a schematic perspective view onto the base surface of the solenoid valve.
Figure 3:
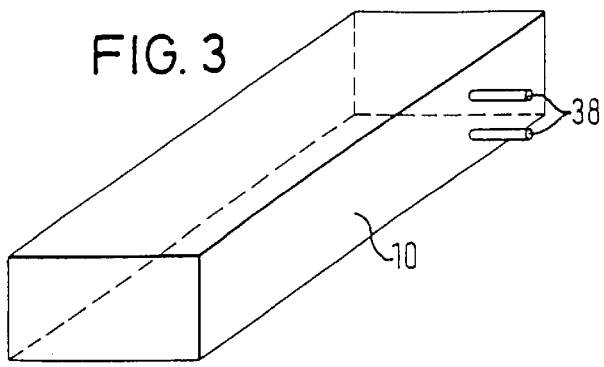
FIG. 3 shows a schematic perspective view onto the top side of the solenoid valve.

The solenoid valve has an elongated, narrow and parallelepiped housing 10 consisting of two halves joined together. At one longitudinal end of the housing 10, there is a solenoid drive with a solenoid 12 and a core 14 surrounded by it. Next to the inner end plane of the solenoid 12 and the core 14 is a space 16 in which a permanent magnet 20 encased in an elastomer jacket 18 is arranged so that it can move between two soft iron parts 22. The permanent magnet 20 is connected to one end of an elongated actuation lamina 24. The other end of the actuation lamina 24 protrudes into a fluidic space 26, at the longitudinal end of the housing 10 opposing the solenoid drive. A frame 28 of an elastomer material is clamped between the two halves of the housing 10 and connected to the adjoining end of the actuating lamina 24. The actuating lamina 24, at its end adjoining the fluidic space 26, is swivel-mounted to the housing 10 by the elastomer material of the frame 28 surrounding it. At the same time, the fluidic space 26 is sealed off from the space 16 by the clamped-in elastomer frame 28. Two sealing seats 30, 32, opposing each other, are formed in the fluidic space 26, between which the closing element 34, moved by the actuating lamina 24 and situated on the frame 28 made of elastomer material, can move. Three fluidic connectors 30*a*, 32*a* and 36 are provided, leading from the fluidic space 26 to the top side of the housing 10, as is schematically shown in FIG. 2. From the base surface of the housing 10 protrude two soldering pins 38 which are electrically connected to the solenoid 12, as is illustrated in FIG. 3.

Both the shape and the size of the housing 10, as well as the arrangement of the soldering pins 38 at its base surface are designed to suit the standard grids of printed circuit boards. The width B of the housing 10 is, to give an example, only 5.5 mm. The fluidic connections 32*a*, 30*a*, 36 at the top side of housing 10 are easily accessible. They may be configured as plug connectors, hose nipples or similar.

Figure 1:
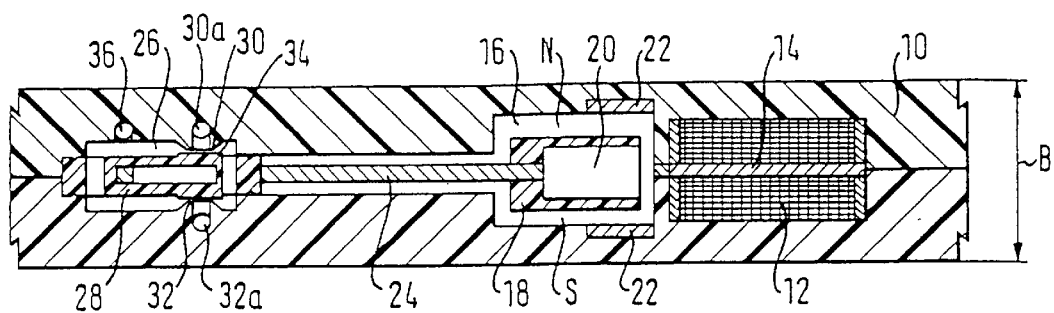
FIG. 1 shows a schematic longitudinal section of the miniaturized solenoid valve.
Figure 5:
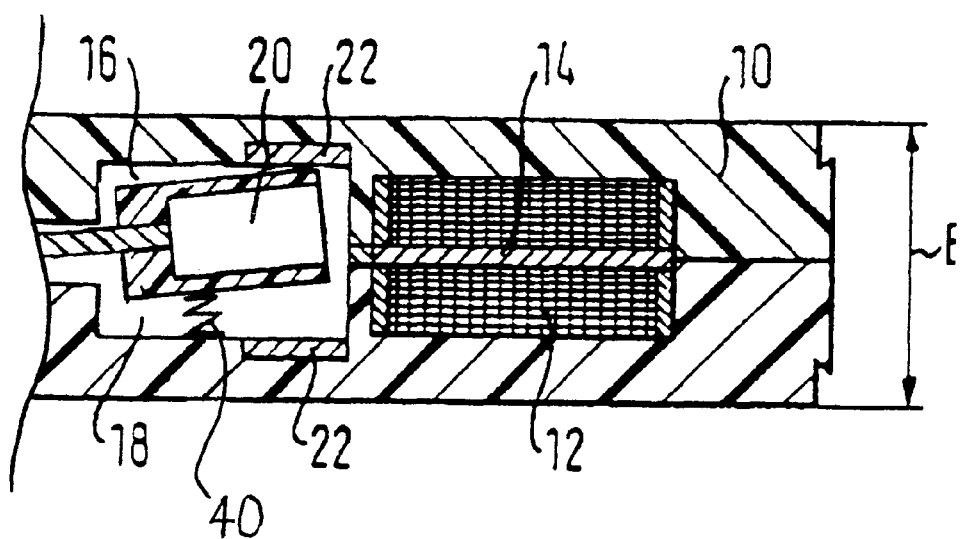
FIG. 5 shows a schematic partial longitudinal section of the miniaturized solenoid valve with the permanent magnet biased into one of two switching positions.

The permanent magnet 20 in FIG. 1 is shown in an intermediate position between the soft iron parts 20, 22. However, in such a position the solenoid drive is not stable. By interaction of the permanent magnet 20 with the soft iron parts 22, the permanent magnet 20 takes up one of two stable positions, that is to say it rests against either of the two soft iron parts 22. These soft iron parts 22 consist of thin plates inserted into the housing 10, e.g. by injection molding, in case the housing is made of plastic. By the arrangement of the solenoid 12, with its axis in the center plane of the housing 10, a magnetic field will be produced when current-carrying which interacts with the permanent magnet 20 and, depending on the direction of the magnetic flux, moves the permanent magnet 20 into one or the other switching position. The direction of magnetic flux is, in turn, determined by the polarity of an electric pulse applied to the solenoid 12. In one embodiment of the invention, shown in FIG. 5, a biasing spring 40 is provided to spring bias permanent magnet 20 into one of the two stable switching positions, i.e., resting against either of the two soft iron parts 22.

Figure 4:
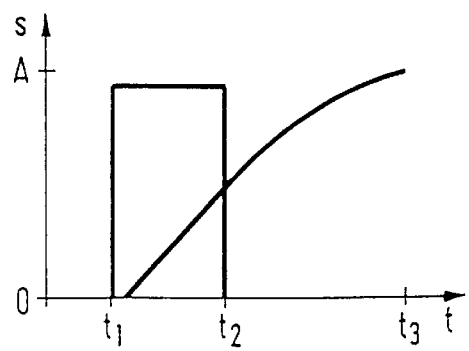
FIG. 4 shows a diagram to illustrate the method of operation of the solenoid valve.

In order to provide the drive for the solenoid valve, a drive circuit is provided which delivers only switching pulses of short duration in each case. The duration of the switching pulses is selected in such a way that the force effect on the permanent magnet 20 ends before it has reached its switching position. If the permanent magnet 20 has to cover the distance OA between its switching positions, and the electrical drive pulse starts, for example, at the point in time $t_1$, as illustrated in FIG. 4, then the drive pulse already ends at the point in time $t_2$, for example, before approximately half the distance has been covered; only at the point in time $t_3$ will the switching position be reached. The movement of the permanent magnet 20 past the point in time $t_2$ is therefore not subjected to further acceleration, helping to prevent bounce from the switching position reached when this position is reached at the point of time $t_3$. The duration $t_2-t_1$ of a drive pulse may, for example, amount to 20 ms.

What is claimed is:

1. A miniaturized solenoid valve, comprising a generally parallelepiped housing (10) which contains a solenoid drive (12, 14) and a fluidic space (26) separated therefrom, said solenoid drive (12, 14) including a permanent magnet (20) which can move between two soft iron parts (22), and a solenoid (12) whose current-pulse induced magnetic field moves the permanent magnet (20) against one or the other soft iron parts (22), depending on the polarity of the magnetic field, said soft iron parts (22) being spaced from said solenoid (12) and supported by said housing (10).

2. The solenoid valve according to claim 1, wherein at the top side of the housing (10) opposite the base surface, fluidic connectors (30*a*, 32*a*, 36) lead out of the fluidic space (26).

3. The solenoid valve according to claim 1 or 2, characterized in that the housing (10) is of elongated construction, the fluidic space (26) is arranged at one longitudinal end of the housing (10) and the solenoid drive (12, 14) at the other, and that an actuating lamina (24) extends from the solenoid drive (12, 14) toward the fluidic space (26).

4. The solenoid valve according to claim 1, characterized in that the actuating lamina (24) is swivel-mounted in the housing (10), near the fluidic space (26) by means of a jacket made of an elastic material.

5. The solenoid valve according to claim 1, wherein the solenoid drive (12, 14) can take up two stable switching positions.

6. The solenoid valve according to claim 1, wherein the permanent magnet (20) is biased by spring force into one of two switching positions and has a stable switching position.

7. The solenoid valve according to any one of the claims 1, 5 or 6, including an associated drive circuit which for each actuation supplies a current pulse which terminates before the respective change-over position is reached.

8. The solenoid valve according to claim 5, including an associated drive circuit which for each actuation supplies a current pulse which terminates before the respective change-over position is reached.

9. The solenoid valve according to claim 6, including an associate drive circuit which for each actuation supplies a current pulse which terminates before the respective change-over position is reached.

10. The solenoid valve according to claim 1, wherein soldering pins (38), electrically connected to the solenoid drive (12), protrude from a base surface of the housing (10).

* * * * *